June 28, 1960  E. M. BROCKWAY  2,942,518
TOOLMAKER'S MICROSCOPE
Filed May 6, 1955

INVENTOR.
ELLSWORTH M. BROCKWAY
BY
ATTORNEYS though
2,942,518
TOOLMAKER'S MICROSCOPE Ellsworth M. Brockway, Rochester, N.Y., assignor to Bausch & Lomb Optical Company, Rochester, N.Y., a corporation of New York Filed May 6, 1955, Ser. No. 506,431

2 Claims. (Cl. 88—39)

This invention relates to optical instruments and more particularly it has reference to a toolmaker's microscope.

Toolmakers' microscopes currently on the market have employed many and varied systems for providing episcopic and diascopic illumination for an object supported on the stage of said microscope. For instance, in one current instrument two separate light sources are provided, one for episcopic and the other for diascopic illumination or, when it is desired to illuminate both the surface and the contour of an object, both light sources are employed, one for illuminating the surface of the object, the other for illuminating the profile or contour of the object. This system has the disadvantage of requiring two light sources, each with a separate set of optics, which needlessly adds to the expense of producing the instrument and unnecessarily adds to the complexity of maintaining and using same.

Other current instruments provide either a vertical illuminator which illuminates episcopically only or provide a substage illuminator which illuminates the contour of an opaque object or transilluminates a transparent object. These last-named instruments have serious limitations since they are adapted to perform the one specific operation only.

It is, therefore, a primary object of this invention to provide an improved toolmaker's microscope that overcomes the above-noted disadvantages of the prior art.

It is another object of this invention to provide an improved toolmaker's microscope that will have one illumination system for both episcopic viewing and contour viewing of an object.

It is a further object of this invention to provide an improved toolmaker's microscope that will have substantially the same amount of illumination reflected onto the contour of the object on the stage throughout the whole range of vertical focusing movements of the microscope.

And a still further object of this invention is to provide an improved toolmaker's microscope that will be compactly and simply constructed, which will be efficient in use, uniform in operation and unlikely to get out of repair.

These and other objects and advantages reside in certain novel features of the construction, arrangement and combination of parts as will be apparent to those skilled in the art by reference to the following description and accompanying drawings in which:

Fig. 4 is a schematic showing of the optics of the illumination system.

Figure 1:
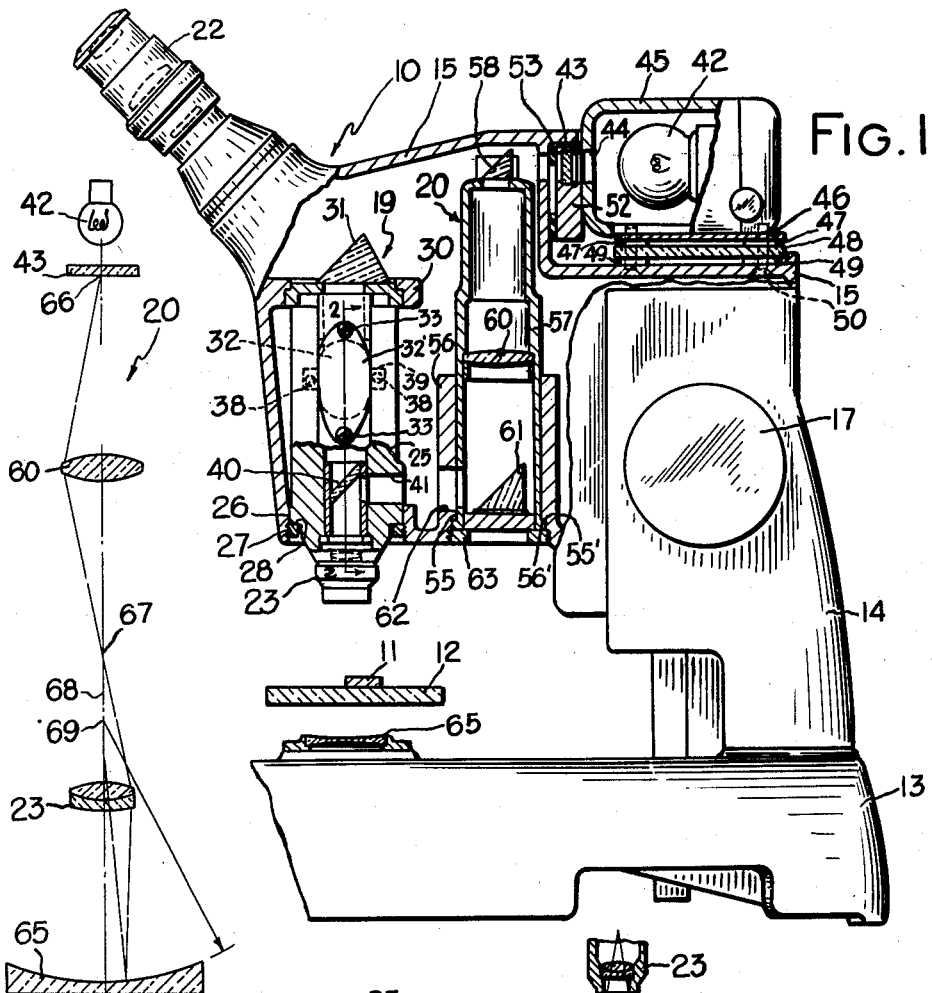
Fig. 1 is a side view, partly in section, of a toolmaker's microscope embodying a preferred form of my invention.

A toolmaker's microscope 10 for the examination of an object 11 carried by a transparent portion of a stage 12 is provided with a stand 13 having on one end portion a vertically disposed casing 14. A housing 15 is vertically adjustable on said casing 14 by means of any conventional adjusting mechanism, such as a rack and pinion, that is adapted to be actuated by a knob 17 on the side of said casing. Turning said knob 17 will vertically adjust the housing relative to the object 11 for a reason to be described hereinafter. The stage 12 supporting the object 11 is adapted to be moved transversely and longitudinally relative to the stand 13 in any conventional manner, such as by micrometer screws having measuring scales, not shown.

A viewing system 19 and an illumination system 20 are carried, respectively, within the front and the rear of the housing and cooperate in such a way as to provide a vertical illuminator type microscope. A "vertical illuminator" type microscope, as usually known in the microscope art, is understood to be a microscope in which the illumination enters the side of the tube or objective and is reflected vertically downward through the objective and is thereby concentrated upon the object.

The viewing system 19 comprises an eyepiece 22 upwardly projecting from the housing 15 which has depending from the lower portion thereof an objective 23 optically aligned with said eyepiece. Said objective 23 is mounted on the lower end of a sleeve 25 which is inserted through an opening 26 in the lower portion of the housing and is held therein by the nut 27 seated against the flange 28 on the sleeve 25 for urging the inner end of said sleeve 25 against a seat on a lug 30 carried by the inside of the housing 15 whereby the sleeve 25 is removably positioned in said housing. Mounted on the inner or top end of said sleeve 25 in the optical path of the optical system is an inverting prism 31 which is adapted to invert the image of the object 11 carried by the transparent portion of the stage 12.

Figure 2:
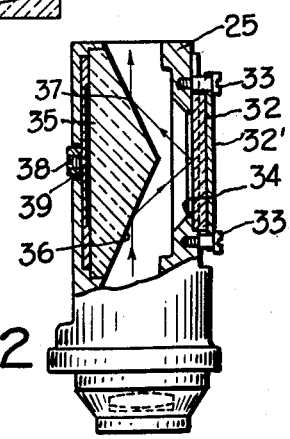
Fig. 2 is a sectional view taken on the line 2—2 in Fig. 1.

The sleeve 25 has a set of reflecting members mounted in the optical path of the optical system for reverting the image of said object 11 carried by the transparent stage 12. As best shown in Fig. 2, said set of reflecting members comprises a vertically positioned plane mirror 32 fastened by plate 32' and screws 33 over an opening 34 in the side of the sleeve 25 so that said mirror will lie in a plane substantially parallel to and displaced from said optical path. The remainder of said set of reflecting members comprises a glass block 35 having a pair of reflecting surfaces 36, 37 thereon facing said mirror 32 and lying in planes that are angularly disposed relative to each other and intersect the optical path at angles that are substantially equal and opposite to each other whereby light rays received by the reflecting surface 36 are reflected to the mirror 32 and then to the other reflecting surface 37 so that the image of the object 11 formed by the objective will be reverted. Said block 35 is fastened in the sleeve 25 by means of screws 38 and plate 39. With this arrangement, the resulting image is viewed in the same relative position as the object, i.e., the right side of an object on the stage 12 will be the right side of the image of the object as viewed in the eyepiece of the microscope.

Also positioned in the sleeve 25 and disposed at an angle of approximately 45° with the optical axis of the optical system is a semi-transparent mirror 40 which transmits light rays from the object 11 to the eyepiece of the microscope. The reflecting surface of the mirror 40 faces an opening 41 in the wall of the sleeve 25 through which illumination is received in a manner and for a reason to be described hereinafter.

The illumination system 20 comprises a light source 42 which is carried by and thermally insulated from the upper portion of the housing 15 and has a heat-absorbing type glass diffuser plate 43 aligned with an opening 44 in a casing 45 in which said light source 42 is mounted. The bottom of casing 45 has an opening over which is mounted an aluminum plate 46 which is held, by washers 47, in spaced relation to a non-metallic plate 48 which is spaced from the housing 15 by washers 49. Screws 50 extend from the housing 15 and pass through the openings in the washers 47, 49 and plates 46, 48 into engaging relation with the casing 45 whereby heat radiated from the light source 42 will be absorbed by the aluminum plate 46 which will radiate a lesser amount of heat across the air space to the plate 48 which in turn will absorb and dissipate some of the heat so that only a small portion will ultimately be radiated across the air space to the housing 15. Between the front of the casing 45 and the housing 15 there is mounted a heat-insulating plate 52, having an aperture in which the filter or diffuser plate 43 is held. A washer 53 is positioned between the plate 52 and housing 15. Since the washers 47, 49 and 53, the screws 50 and the plates 48 and 52 are formed of materials which have relatively low heat conductivities, the housing 15 and associated optics will not be affected by heat from the light source and will continue to be accurate and usable for extended periods. Successful results have been obtained by making the screws 50 and the washers 47, 49 and 53 of a material sold under the trademark "nylon" and by using a material sold under the trademark "Bakelite" for the plates 48 and 52.

Projecting inwardly from the housing 15 in alignment with an opening 55 in the bottom portion thereof is a cylindrical member 56 into which is slidably received a tube 57 having a prism 58 supported by the upper portion thereof in alignment with the path of light rays from the light source 42 for reflecting said light rays along the axis of said tube 57 through a condenser lens 60 mounted in said tube 57 and onto a reflector 61 whereby the light rays will be reflected laterally through an opening 62 in the side of the tube 57. The tube 57 is held in proper position in said cylindrical member 56 by the nut 63 which is threaded into the opening 55 in the housing 15 for holding the collar 56' against a shoulder 55' on member 56. The tube 57, may, therefore, be easily removed from the housing for cleaning and adjusting the prism 58, reflector 61 and condenser lens 60.

The reflector 61 and the opening 62 in the tube 57 are aligned with the opening 41 in the sleeve 25 and with the reflecting surface of the semi-transparent mirror 40 whereby light rays from the light source 42 will pass through the heat-absorbing glass 43 and will be reflected by the mirror 58 through the condenser lens 60 onto the reflector 61 and thence onto the semi-transparent mirror 40 which will reflect said rays through the objective 23 and onto either the object 11 or through the unobstructed portion of the stage 12.

Figure 3:
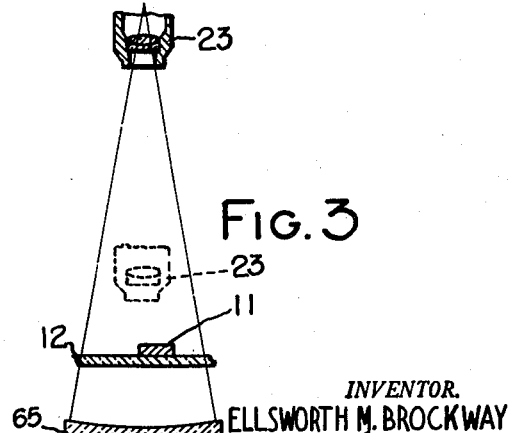
Fig. 3 is a schematic showing of certain details of the invention.

Mounted below the transparent stage 12 and positioned on the stand 13 in the optical path of the optical system is a concave mirror 65 which has its center of curvature above the plane of the objective 23 for all adjusted focusing positions of said objective. That is, the center of curvature will lie in a plane that will always be above the plane of the objective no matter whether the objective 23 and housing 15 are in the lowermost position, as illustrated in dotted lines in Fig. 3, or in the uppermost position shown in solid lines in Fig. 3.

Referring specifically to Fig. 4, the various reflectors 58, 61 and 40 have been eliminated from the schematic showing of the illumination system 20 which has been spread out in a straight path for illustration purposes. The condenser lens 60 is positioned to project an image of the glass 43 into a plane 67 spaced from the objective 23 a distance greater than the back focus of said objective 23. The illuminator light emerging downwardly from the objective 23 is thus converging toward the concave mirror 65. The manufacturing tolerances for the lens 60 and its mounting in the tube 57 can be broad in scope so long as the image plane 67 remains a distance from the objective 23 greater than the focus of said objective. The light rays reflected by the mirror 65 will never come to a focus in an object plane of the objective 23 or at the center of curvature of the mirror 65. This has the advantage of providing substantially equal amounts of illumination for the contour of the object 11 at all adjusted positions of the microscope relative thereto. The radius of curvature of the mirror 65 is such that the image of the objective 23 as projected by the mirror 65 will never (within the focusing movement of the microscope) be in the image plane of the objective 23. This avoids the possibility of seeing, in the field of the microscope, dust or other foreign matter which might be on the lens surfaces of the objective 23.

To check or examine the contour and surface of an opaque object 11 on the stage 12, it is only necessary to adjust said stage in the horizontal plane for aligning the edge of the object with the optical path of the optical system. The knob 17 is turned to vertically adjust the microscope relative to the stage until the object is in sharp focus. Part of the illumination from the light source 42 will be projected onto the surface of the object aligned with the optical path and the rest of the illumination will pass through stage 12 to the concave mirror 65 where a portion will be reflected back onto the edge of the object for illuminating the contour of the object as viewed through the eyepiece of the microscope. Hence, by use of a single light source, the upper surface of the object will be episcopically illuminated and at the same time the contour of the object will be diascopically illuminated.

Since this instrument is primarily for the use of toolmakers in the shop or factory, it will be subjected to dusty, greasy and dirty conditions so much so that, no matter how well the housing 15 is sealed, the optics will require occasional cleaning. This is readily facilitated by means of the easily removably tube 57 and sleeve 25 which collectively carry the majority of the optics of the system. Said tube 57 and sleeve 25 are constructed in such a way that proper seating in their respective openings in the housing will correctly align the optics carried thereby with the remainder of the system. This materially reduces the time that the instrument will be out of operation during cleaning thereof.

Toolmakers, and other skilled craftsmen, when using current microscopes, are continually bothered by the mental switch required in moving the object to the left when it is desired to have the image move to the right. This problem is eliminated in the present instrument by the use of the image reverting system which provides the worker with a means whereby the image and object move together in the same direction.

It will be seen that there is here provided an improved toolmaker's microscope wherein one illumination system accomplishes both surface and contour illumination of the objects being examined. The instrument is provided with a curved mirror under the transparent stage so that substantially the same amount of illumination will be reflected onto the object being examined for all vertically adjusted positions of the microscope. The improved toolmaker's microscope is compactly and simply constructed and is efficient in use, uniform in operation and unlikely to get out of repair, all substantially as set out in the objects of this invention.

Although only one embodiment of this invention has been shown and described in detail, it will be understood that other embodiments are possible and changes may be made in the form and arrangement of the parts and substitutions may be made therein without departing from the spirit of the invention as defined in the appended claims.

I claim:
1. A vertical illumination type microscope comprising a base, a stage mounted on said base, a carriage movable on said base toward and away from said stage, an optical viewing system including an objective lens mounted on said carriage for viewing an object supported on said stage, a vertical illuminator fixed with respect to said viewing system for projecting light through said objective lens toward said stage, said light emerging from said objective lens in a convergent pattern, and a concave mirror fixed on said base on the opposite side of said stage from said objective lens for reflecting light from said lens back toward said microscope for profile illumination of an object supported on said stage, the radius of curvature of said mirror being greater than the maximum spacing between said mirror and said lens as determined by the limits of travel of said carriage.

2. In an optical instrument the combination of a base having a transparent object stage thereon, a housing vertically movable on one portion of said base above the stage, a viewing system carried at the front side of said housing and comprising an eyepiece projecting upwardly from the front side of the housing and an objective projecting from the lower portion of the front side of the housing in optical alignment with said eyepiece and said object stage, an illumination system carried at the rear side of said housing and comprising a light source mounted on and opposite an opening formed in the upper portion of said rear side, a reflecting member mounted in the upper portion of the rear side of the housing in optical alignment with the opening and light source to reflect light rays downwardly along a path substantially parallel to the axis of the objective, a second reflecting member mounted in the lower portion of the rear side of the housing in said path of the light rays, a condenser lens positioned between said reflecting members and in optical alignment therewith, a semi-transparent mirror mounted in the optical axis of the objective and in the optical path of the light rays from said second reflecting member, and a concave spherical mirror positioned below the stage, one conjugate plane of the condenser lens being located at the source, the other conjugate plane of the condenser lens being spaced from the objective a distance which is greater than the back focus of the objective, the center of curvature of the concave mirror being located in a plane which is above the objective for all positions of the objective relative to the stage whereby both the upper surface and the contour of an object on the stage may be illuminated.

References Cited in the file of this patent

UNITED STATES PATENTS

| | | |
|---|---|---|
| 2,146,506 | Maisch | Feb. 7, 1939 |
| 2,161,623 | Hensoldt | June 6, 1939 |
| 2,216,003 | Eppenstein et al. | Sept. 24, 1940 |
| 2,290,665 | Arnesen | July 21, 1942 |
| 2,349,457 | Osterberg et al. | May 23, 1944 |
| 2,357,378 | Benford | Sept. 5, 1944 |
| 2,539,904 | Ludewig | Apr. 22, 1952 |
| 2,622,473 | Littmann | Dec. 23, 1952 |

FOREIGN PATENTS

| | | |
|---|---|---|
| 427,049 | Germany | Mar. 24, 1926 |
| 482,262 | Great Britain | Mar. 24, 1938 |